(12) United States Patent
Hughes et al.

(10) Patent No.: US 7,716,664 B2
(45) Date of Patent: May 11, 2010

(54) METADATA-BASED APPLICATION MODEL FOR LARGE APPLICATIONS

(75) Inventors: Aidan T. Hughes, Bellevue, WA (US); J. Anthony East, Redmond, WA (US); James A. Bennett, Duvall, WA (US); Paul C. Barr, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 415 days.

(21) Appl. No.: 11/026,953

(22) Filed: Dec. 30, 2004

(65) Prior Publication Data

US 2006/0150182 A1    Jul. 6, 2006

(51) Int. Cl.
*G06F 9/445* (2006.01)
(52) U.S. Cl. ...................... 717/175; 707/821
(58) Field of Classification Search .................. 707/101
See application file for complete search history.

(56) References Cited

U.S. PATENT DOCUMENTS

| | | | | |
|---|---|---|---|---|
| 5,371,851 | A * | 12/1994 | Pieper et al. | 345/501 |
| 5,727,205 | A * | 3/1998 | Bell et al. | 707/200 |
| 6,363,499 | B1 | 3/2002 | Delo et al. | 714/15 |
| 6,389,427 | B1 * | 5/2002 | Faulkner | 707/104.1 |
| 7,123,608 | B1 * | 10/2006 | Scott et al. | 370/353 |
| 7,124,414 | B2 * | 10/2006 | Wang et al. | 707/E17.032 |
| 7,191,436 | B1 * | 3/2007 | Durr et al. | 717/170 |
| 2002/0144248 | A1 * | 10/2002 | Forbes et al. | 717/167 |

OTHER PUBLICATIONS

InstallShield, "InstallShield AdminStudio Evaluator's Guide", Mar. 28, 2004, p. 1-31.*
IBM, "Multiproduct Installations in One Umbrella", NNRD448174, IBM Technical Disclosure Bulletin, Aug. 1, 2001, Issue 448, p. 1434,( hereinafter TDB448174).*
Baker, "The Official InstallShield for Windows Installer Developers Guide", Feb. 15, 2001, Wiley, P. TOC, 201-204, Index.*
Hewlett-Packard Company, "Software Installation Guide HP JetDirect Printer Installer for UNIX", Dec. 2000.*
Agilent, "Using Swinstall to Install HP-UX software Packages", Aug. 2000, Agilent Technologies.*
archive.org, "What is UNIX?(r)? POSIX Software Administration", Retrieved Dec. 2003, <http://web.archive.org/web/2003/1221012109/http://www.unix.org/version2/whatsnew/softadmin.html>.p. 1-4.*
MIT, "install—install a program, script, or datafile", Dec. 1991, "mit/util/scripts/install.sh", p. 1-5. (repaginated).*
HP, "tar(1) HP-UX 11i Version 1.6, Jun. 2002" , Jun. 2002, Technical Documentation, p. 1-5, hereinafter Tar.*
Baker, "Getting Started with InstallShield Developer and Windows Installer Steups", May 16, 2002, InstallShield Press, p. 14-17, 50, 52, 58, 59-60, 67, 69, 96, 100, 165-166, 172, 212-213, 224-227, 245-248, 251, 253, 261, 652, back cover.*

* cited by examiner

*Primary Examiner*—Khanh B Pham
(74) *Attorney, Agent, or Firm*—Merchant & Gould P.C.

(57) ABSTRACT

A metadata-based application model for software systems provides for the integration and storing of application metadata with the application itself effectively replacing the system registry. In calling or updating the application components or modules, queries to the metadata within the application folders returns references to the files with metadata that matches the query. The component or modules are called or updated within the file using the returned reference. The present invention also provides a data structure comprising a data field for the application code and another field for the metadata.

11 Claims, 7 Drawing Sheets

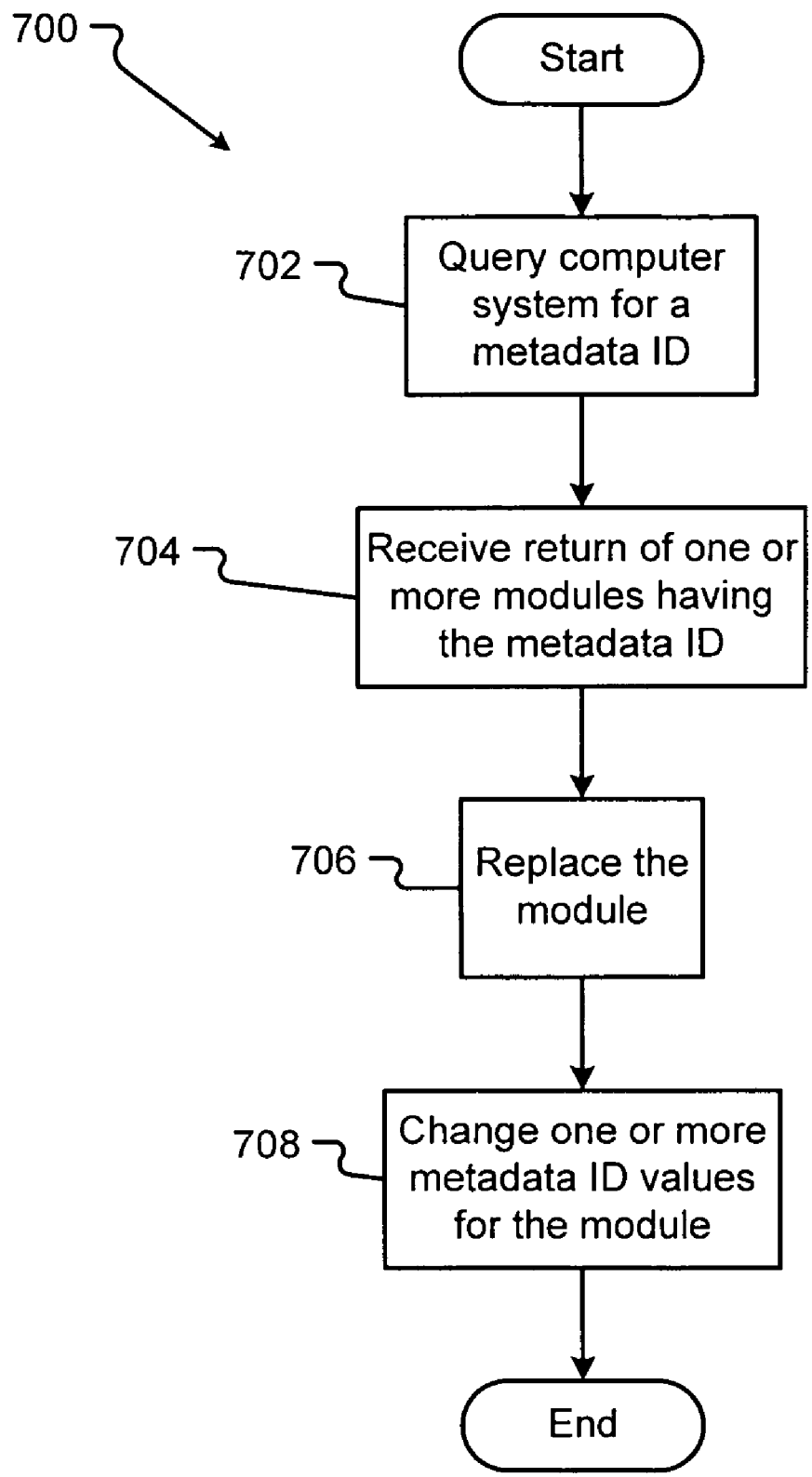

METADATA-BASED APPLICATION MODEL FOR LARGE APPLICATIONS

TECHNICAL FIELD

The present invention relates generally to software systems. More particularly, the present invention relates to object-oriented software applications with system registries.

BACKGROUND OF THE INVENTION

Object-oriented software systems provide software architectures that organize and interconnect software objects within a computer system. Generally, software within an object-oriented system is organized into classes containing one or more software object. A software object is a self-contained software construct that includes data and methods. The software objects may use data or methods in other software objects by calling those objects to execute a method or return data. An application, such a Microsoft® Excel spreadsheet application, may have executable code organized into several classes of software objects. Generally, an application operates with several features, each having one or more components. The components and hence, the features may be formed from one or more classes or one or more objects.

When an application is installed in a computer, the computer system stores the software components of the application, onto a storage medium accessible by the computer. In addition, the installation stores metadata associated with the application to the computer. Metadata is information about the application. Generally, the metadata describes the installation of the application, objects the application calls, settings for the application, and other information. Typically, the metadata is written to a system registry in a known location. The system registry holds the metadata for at least some applications and modules that operate on the computer. In general, as the complexity and interconnectedness of the software applications increases, more and more items of metadata are stored to the registry. For example, when installing Microsoft® Office Pro 2003 suite of programs, the installation writes more than 14,000 keys of metadata to the registry.

Unfortunately, many problems occur when using the registry. For instance, when a new application is installed and the application installs a new version of a software module or component that is already stored on the computer, the metadata stored for the existing module is overwritten by the metadata for the new version of the module. Any connection between a previously existing program that requires the older version is broken and the existing program may fail to operate. Also, if the newer version of the module is removed, the metadata for the older version of the module is not restored in the registry, causing further problems.

Large programs with numerous modules, each module typically having its own metadata to write to the registry generally complicate the installation process. The conflicts between sets of like metadata must be checked, new metadata must be stored in the registry, and some metadata needs to be overwritten. Typically, a separate installer program must be developed and employed to complete the installation process. The installer program is designed to resolve the problems with the metadata storage. Unfortunately, the installer programs consist of their own sets of code that developers must write to install applications, and furthermore, using an installer slows the installation process because the installer program typically interfaces with the user rather than simply copying the code to the computer. It is with respect to these considerations and others that the present invention has been made.

SUMMARY OF THE INVENTION

The present invention relates to a metadata-based application model for software systems that provides for the integration and storing of a file's metadata with the file itself instead of in the registry. In embodiments of the invention, methods for installing an application are provided. The installation method first creates an application folder within the file system. The code in the software modules, also referred to as application components, for the application is stored in the application folder. The application metadata, integrated with the application, is stored in the same application folder. While the metadata may be a separate file or set of data, the metadata is integrated with the application. In other words, the metadata is intrinsically bound to the application. The application may have one or more submodules that are part of the code in the modules. If there are submodules, one or more subfolders are created and the modules representing the submodules are stored in the subfolders. Metadata integrated with the submodules is also stored in the subfolders.

In another embodiment of the present invention, the metadata facilitates a call of a module. A query is made to metadata integrated with one or more modules within the application folder. Upon finding metadata that matches the query, a reference is returned to a module. The reference is then used to call the module. During the calling of the module, embodiments of the present invention do not call or query a system registry.

Another embodiment of the present invention provides a method for changing software using the metadata. Again, a query searches metadata integrated with one or more modules stored with one or more applications. A reference is returned for one or more modules having metadata that matches the query. Using the reference, the one or more modules are changed. Changing the modules includes patching the modules, updating the modules, or uninstalling the modules. Finally, one or more items of metadata are changed to reflect the changes in the modules.

In another embodiment of the present invention, a data structure is provided, having a first data field that includes the application. The second data field includes the metadata for the application. The metadata in the second data field is integrated with the application in the first data field.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detailed description of exemplary embodiments of the invention, and to the appended claims.

BRIEF DESCRIPTION OF THE DRAWINGS

FIG. 7 is a flow diagram representing an embodiment of the present invention for updating a module in a computer having integrated metadata.

DETAILED DESCRIPTION OF THE INVENTION

The present invention will now be described more fully hereinafter with reference to the accompanying drawings, in which embodiments of the invention are shown. The invention may however, be embodied in many different forms and should not be construed as limited to the embodiments set forth herein. Rather, these embodiments are provided in an effort to make the disclosure thorough and complete and such that it will fully convey the scope of the invention to those skilled in the art.

The present invention provides methods and systems for integrating application metadata with the application software components, or simply referred to as a module. A module may be any type of software construct, such as a class, an object, a separate application, etc. Metadata is the information identifying and describing files, COM components, type libraries, shortcuts, and other information. In a Component Object Model (COM) system, the metadata may be providing searchable metadata. The searchable metadata exposes the application software objects to discovery by other software objects without the use of pointers within a system registry.

Figure 1:
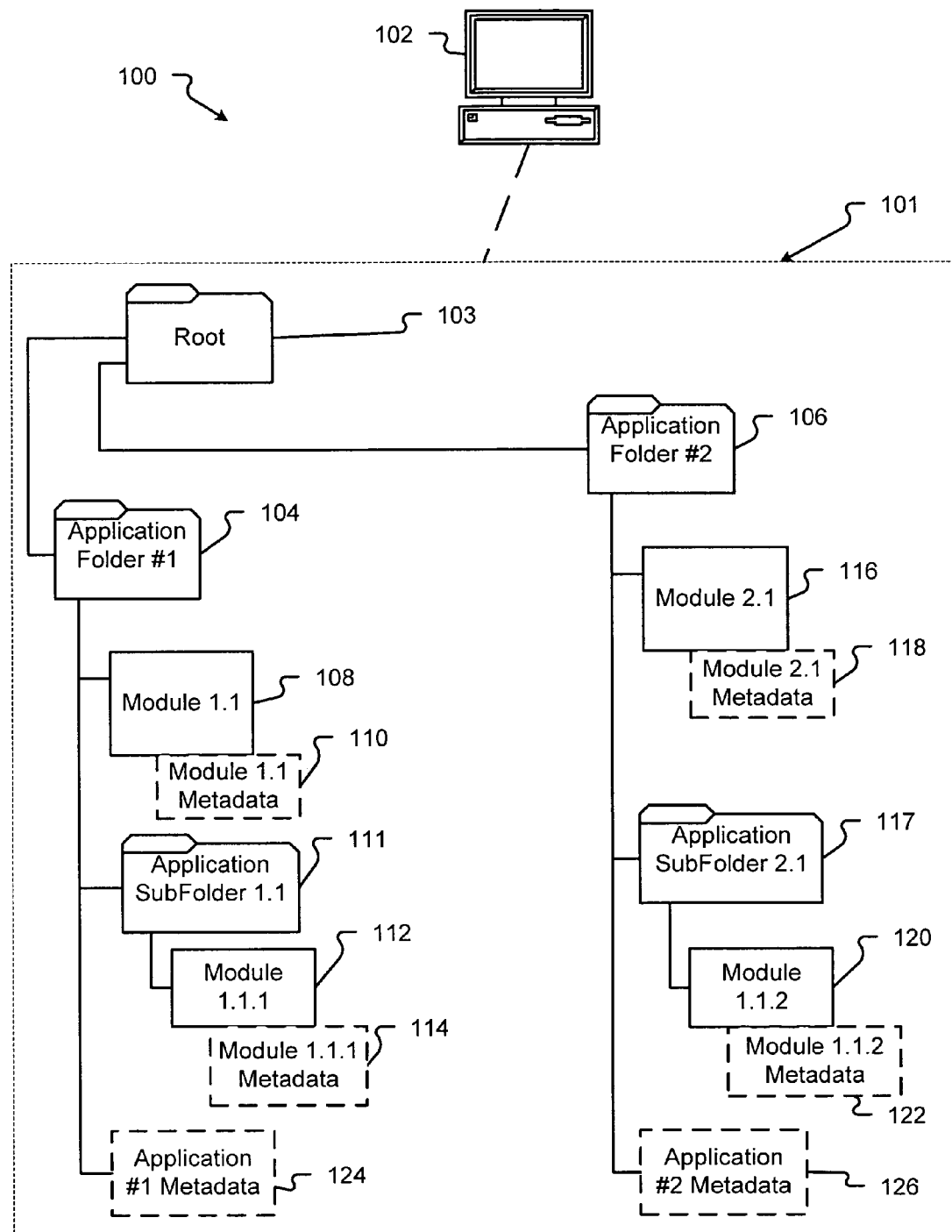
FIG. 1 is an exemplary embodiment of a computer system having aspects of the present invention with two applications stored on the computer having metadata integrated with the applications.

An exemplary embodiment of the metadata model 100 is shown in FIG. 1. Here, a computer 102 has a file system 101 with a root directory 103. Under the root directory 103, the file system 101 has two application folders 104 and 106 that store the application files. A first application folder 104 has one or more modules 108 and 112, also referred to as application components, and metadata 124. The metadata 124 specifies the installation information required in an object-oriented software system for the application in folder 104. In embodiments of the present invention, the metadata 124 includes information about modules within the application, Component Object Model (COM) objects required by the application in folder 104, files within the application, and other information. A module is a software construct that can include a software object, method, COM object, component, feature, or other software item. A second application folder 106 also includes one or more modules and metadata 126. The metadata 124 and 126 contains information about the applications in folder 104 and 106 and any modules that are used by or interact with the applications, such as module 108, 112, 116 and 120.

In the exemplary embodiment, the application file is shown as having a module 1.1 108. Module 1.1 108, in some embodiments, also has metadata 110 integrated with the module 1.1 108. Thus, each module within an application can have a set of integrated metadata that includes further installation information for the module. A module 1.1.1 112 is a separate software submodule or component called by module 1.1 108 to perform some task. For example, module 1.1.1 112 can be a calculator submodule called by a spreadsheet application to make calculations within a spreadsheet. The submodule 1.1.1 112 has a set of installation information in integrated metadata 114. In embodiments of the present invention, a separate subfolder 1.1 111 is created for submodule 1.1.1 112. Thus, module 1.1 108 may be in the application folder 104 while module 1.1.1 112 is in a subfolder 111 that is under but within the application folder 104. Any submodule may be placed within a subfolder. The subfolders may be created upon installing the application.

The second application folder 106 has module 2.1 116 with metadata 118. In this example, the module 2.1 116 calls module 1.1.2 120 in a separate subfolder 2.1 117, which is a different version of the module 1.1.1 112. Thus, the modules reference numbers are incremented, e.g. 1.1.1 and 1.1.2 merely to illustrate the point that the module 120 is a second version of module 112. Module 1.1.2 120 has a separate set of executable code and a second set of metadata 122 from the first version of the module, module 1.1.1 112. In an example, the second application can be a tax program that calls another version of the calculator module, used by the spreadsheet application, to make calculations within the tax program.

Embodiments of the present invention do not write the metadata information to a system registry thus preventing destructive overwrites in the registry. For example, if the first application 104 was installed in a prior art software system, the system registry would include metadata 114 for a first version of the module 1.1.1 112. Upon installing the second application 106, the metadata 122 for the module 1.1.2 120 would overwrite the metadata 114 of the module 1.1.1 112. If module 1.1 108 required module 1.1.1 112 and could not use module 1.1.2 120 for some reason, then module 1.1 108 might be inoperable and the first application 104 may also fail to operate in whole or in part.

In contrast, the present invention integrates the metadata 114 with module 1.1.1 112 and metadata 122 with module 1.1.2 120. The module 1.1 108 searches the application folder 104 for module metadata 114. The module 1.1 108 retrieves module 1.1.1 112 and uses it exclusively. Meanwhile, module 2.1 116 only uses module 1.1.2 120 with integrated metadata 122. The overwriting of the system registry does not occur and several versions of a module or application can coexist on a software system without destructive interactions.

Figure 2:
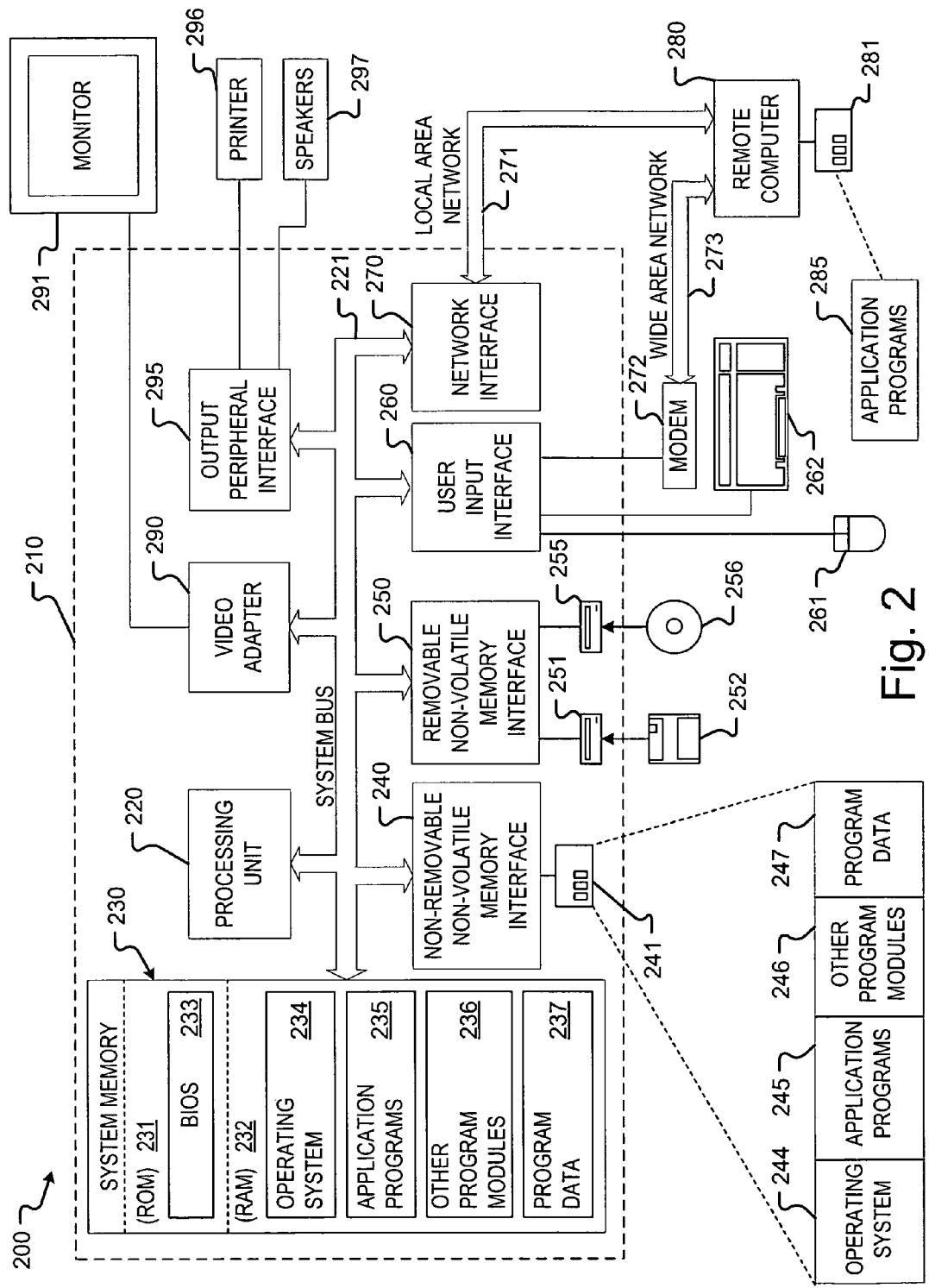
FIG. 2 is a functional diagram illustrating a computing environment and a basic computing device that can operate with the metadata model according to the present invention.

An example of a suitable computing system environment 200 on which the invention may be implemented is illustrated in FIG. 2. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary computer system 200 for implementing the invention includes a general purpose-computing device in the form of a computer 210. Components of the computer 210 may include, but are not limited to, a processing unit 220, a system memory 230, and a system bus 221 that couples various system components including the system memory 230 to the processing unit 220. The system bus 221 may be any of several types of bus structures including a memory bus or memory controller, a peripheral bus, and a local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnect (PCI) bus, also known as the Mezzanine bus.

Computer 210 typically includes a variety of computer readable media. Computer readable media can be any available media that can be accessed by the computer 210 and includes both volatile and nonvolatile media and removable and non-removable media. By way of example, and not limitation, computer readable media may comprise computer storage media and communication media. Computer storage media includes volatile, nonvolatile, removable, and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of the any of the above should also be included within the scope of computer readable media.

The system memory 230 includes computer storage media in the form of volatile and/or nonvolatile memory, such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules, such as metadata model 100, that are immediately accessible to and/or presently being operated on by processing unit 220. By way of example, and not limitation, FIG. 2 illustrates operating system 234, application programs 235, other program modules 236, and program data 237; a metadata model, such as metadata model 100, would operate to provide discoverability of all software stored or executed from RAM 232.

The computer 210 may also include other removable/non-removable, volatile/nonvolatile computer storage media. By way of example only, FIG. 2 illustrates a computer 210 with a non-removable, non-volatile memory interface 240 that reads from or writes to non-removable, nonvolatile magnetic media 241, such as a hard drive. Computer 210 may also include a non-volatile memory interface 250 that reads from or writes to a device 251, such as a disk drive, that reads from or writes to a removable, non-volatile media 252, such as a magnetic disk. In addition, the computer 210 may include an optical disk drive 255 that reads from or writes to a removable, nonvolatile optical disk 256, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface, such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules, and other data for the computer 210. For example, hard disk drive 241 is illustrated as storing operating system 244, application programs 245, other program modules 246, and program data 247, which can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through a user input interface 260 connected to user input devices, such as a keyboard 262 and pointing device 261, commonly referred to as a mouse, trackball, or touch pad. Other input devices (not shown) may include a microphone, joystick, game pad, satellite dish, scanner, or the like. These and other input devices are often connected to the processing unit 220 through a user input interface 260 that is coupled to the system bus 221, but may be connected by other interfaces and bus structures, such as a parallel port, game port, or a universal serial bus (USB).

A monitor 291 or other type of display device is also connected to the system bus 221 via an interface, such as a video interface 290. In addition to the monitor 291, the computer 210 may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device, or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks, such as wireless networks. Such networking environments are commonplace in offices, enterprise-wide computer networks, intranets, and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device 281. By way of example, and not limitation, the remote application programs 285 reside on memory device 281. It will be appreciated that the network connections shown are exemplary and other means of establishing a communications link between the computers may be used.

Figure 3:
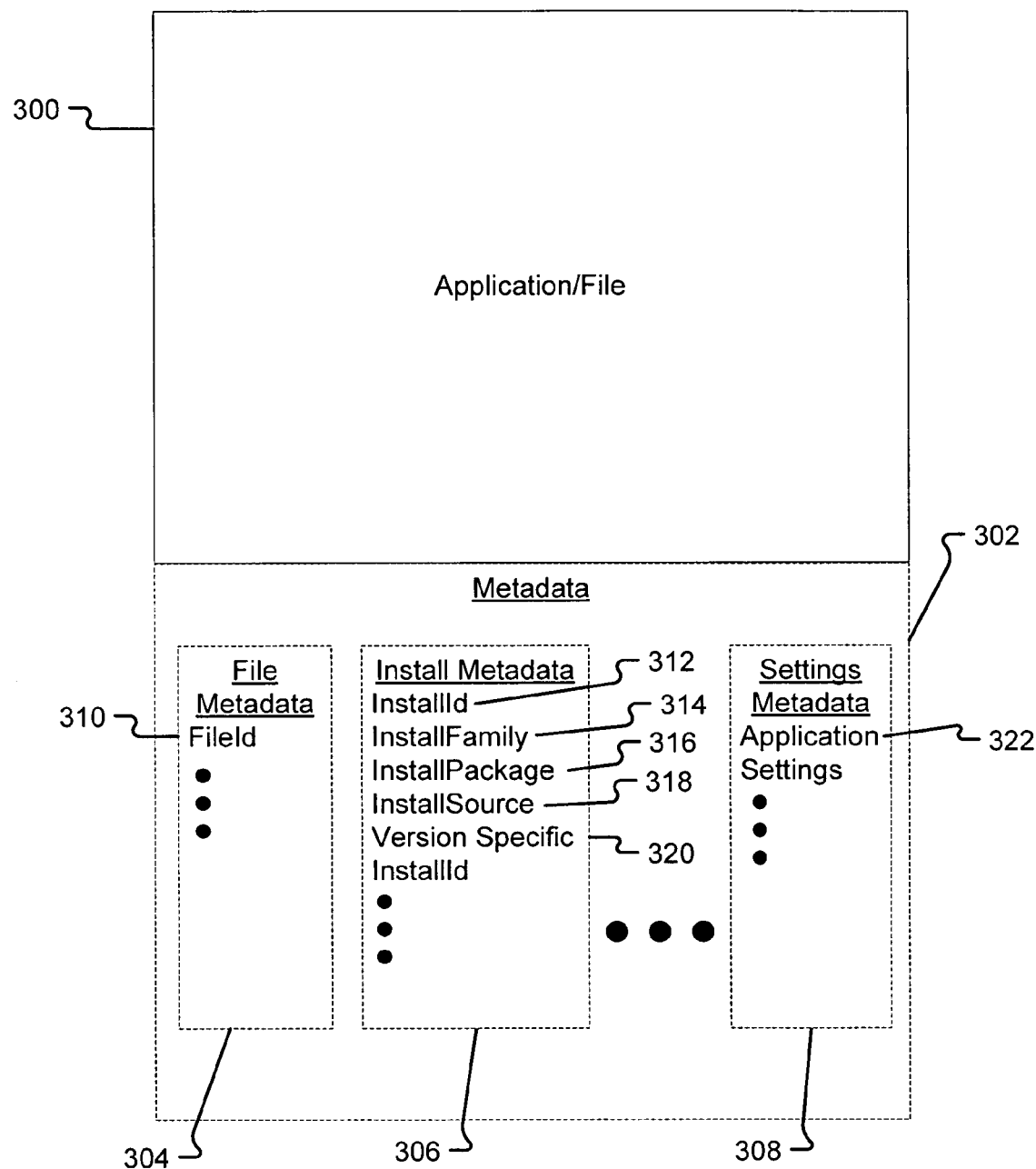
FIG. 3 is an exemplary embodiment of a data structure for an application having the metadata integrated with the application according to the present invention.

An exemplary application file 300 with exemplary metadata 302 associated with the application 300 is shown in FIG. 3. The application 300 is any type of software construct that can have metadata. In embodiments of the present invention, the application 300 is a software application, such as the Microsoft® Excel spreadsheet application, a software add-in, such as Microsoft® PivotTable® module, a software object, a software module, or the like. The metadata 302 represents any configuration data required by the application 300. In embodiments of the present invention, the metadata 302 is any information that would normally be written to a system registry. In other embodiments, the metadata 302 is any information required to support the discoverability of the interfaces with the application 300. For example, the metadata 302 comprises start menu shortcuts, shell extensions, file extension handlers, Microsoft® Internet Explorer add-ins, Windows® operating system Installer Publish Component entries, COM object references, etc.

The metadata 302 is integrated with the application file 300. In other words the metadata is intrinsically bound to the application. Any action affecting the application also affects the metadata. In one embodiment, the metadata 302 is stored with the application file 300. Thus, both the application file 300 and the metadata 302 reside in the same folder within a file system, such as file system 101. In another embodiment, the metadata 302 is a portion of the application file 300 and thus, attached to the application file 300. In embodiments of the present invention, the metadata 302 receives the same file protections as the application file 300 because the metadata 302 is integrated with the application file 300. For example, if the application file 300 was an operating system file with strong protections against overwriting the application file 300, the metadata 302 integrated with the operating system files would also have the same strong protections against overwriting.

In embodiments of the present invention, the metadata 302 comprises one or more types of metadata. In some embodiments, the metadata types comprise File metadata 304, Install Metadata 306, and Settings metadata 308. An author or software developer controls the File metadata 304 of the application file 300. Thus, the software developer that created the application file code generates the File metadata 304. The File metadata 304, in some embodiments, comprises a File Identity (FileId) 310, also referred to as a Publish ID. The FileId 310 helps with software patching or updating, as is explained below. In embodiments of the present invention, the FileId 310 is a globally unique identifier (GUID). Thus, a single file that is distributed with multiple applications can have the same FileId 310. For example, the calculator module distributed with the spreadsheet program and the tax program, discussed with reference to FIG. 1, may have the same FileId 310 regardless of the version. In one embodiment, the FileId 310 is invisible to the user of the application file 300.

In embodiments of the present invention, the metadata 302 also comprises Install metadata 306. The Install metadata 306 may comprise all install information, such as an InstallId 312, an InstallFamily 314, an InstallPackage 316, an InstallSource 318, Version Specific InstallId 320, etc. The Install metadata 306 is associated with the installed application file and controlled by the application installer. In some embodiments, the Install metadata 306 comprises an Install Identity (InstallId) 312. Each file installed, as part of an application 300, has at least one unique InstallId 312. The InstallId 312 helps with module discoverability and object or module calling, as is explained below. The InstallId 312 is visible to the user of the application 300. In embodiments of the present invention, the InstallId 312 is a human-and-machine readable string, such as "Microsoft.Office.12.Extensions.Mso." A file distributed with multiple applications will have different InstallId 312s. For example, the calculator module described with reference to FIG. 1 would have a first InstallId 312 integrated with the spreadsheet application and a second InstallId 312 integrated with the tax program.

In embodiments of the present invention, applications "brand" the versions of the application files or modules with the InstallId 312. The InstallId 312 is unique to the instance of the file. In one embodiment, the InstallId 312 has the following form:

<Publisher>.<Product>.<Version>.<Descriptor>

The <Publisher> token specifies the publisher of the application, such as "Microsoft." The <Product> token specifies the product or product family of the application file, such as "Office." The major release of the application, such as "12," is specified in the <Version> token. Finally, the <Descriptor> token is a developer-selected descriptor for the file, such as "Extensions.Mso." Using the InstallId 312, the application 300 calls requested files, as is explained in more detail below.

In some embodiments, the Install metadata 306 has a Version Specific InstallId 320. The Version Specific InstallId 320 allows other files to call the specific file while reducing the probability of an improper request, i.e. requesting the wrong version of a file. The InstallId 312 may be version independent in some embodiments, and allow a file to call any version of the file. Thus, if any version of a file is suitable, the version independent InstallId 312 is used in the call.

In further embodiments, the Install metadata 306 integrated with the application 300 also includes a specification of an InstallFamily 314. The InstallFamily 314 specifies what application 300 with which the file was installed. Thus, every file installed as part of application 300 has the same InstallFamily 314. The InstallFamily 314, in some embodiments, is visible to the user of the application 300. Thus, the InstallFamily 314 can be a human-and-machine readable string, such as "Microsoft.Office.12."

In still further embodiments, the Install metadata 306 also comprises an InstallPackage 316 and an InstallSource 318. The InstallPackage 316 describes all features and components installed during an installation. Thus, every module stored onto the computer during an install is described in the InstallPackage 316. The InstallSource 318 is a condensed version of the code actually stored during an installation. Thus, if any software module needs to be recovered, the InstallSource 318 may be used to retrieve and restore the software module. In one embodiment, any updates or patches to the application are also stored with the InstallSource 318. In a further embodiment, a subfolder is created in the application folder for the InstallSource 318. Both the InstallPackage 316 and the InstallSource 318 are important to the software and metadata resiliency, as is explained below.

In other embodiments, the metadata 302 further comprises Settings metadata 308. Settings metadata 308 comprises all settings 322 related to the runtime operation of the application 300 or any of the integrated files. In one embodiment, the Settings metadata is integrated into the top-level application folder 300. In other embodiments, the Settings metadata 308 is integrated with any file used by the application 300. In one embodiment, the application settings for a file integrated with the application 300 are stored with the Settings metadata 308 for the application file 300. In one embodiment, settings for a particular file, integrated with the application 300, are stored with the Settings metadata for that file. In embodiments, the Settings metadata 308 is related to a settings file, which describes the available settings and the default values for the settings.

In some embodiments, the metadata has a naming scheme. In one embodiment, the naming scheme has a nomenclature. The nomenclature takes the following form:

<InstallId>.<Metadata Class>/<Descriptor>

The InstallId 312 is as explained above. The Metadata Class is a type of metadata. For example, the Metadata Class is one of "File," "Install," or "Settings." The Descriptor is a predefined or developer selected descriptor for the particular metadata. For example, the metadata descriptor is "InstallId" to describe the InstallId 312, "Options.Styles.Default.Font" to describe the default settings for font style, or "WindowSize" to describe the default setting for window size. One skilled in the art will recognize other Descriptors that can be used to define any type of metadata.

Software developers can create names for the metadata items. However, in some embodiments, some metadata descriptors are set for system-wide schemes. For example, File.FileId for the FileId 310, File.Interfaces for COM registration, Install.InstallId 312 for the instance of the installation may all be specified by the system-wide scheme.

In embodiment of the present invention, the metadata may include only one of the File metadata, Install metadata, Setting metadata, or other type of metadata. In other embodiments, the metadata may include two or more types of the metadata. As one skilled in the art will recognize, the type or configuration of metadata is variable and may only be limited by the type of application module or purpose for the module.

Figure 4:
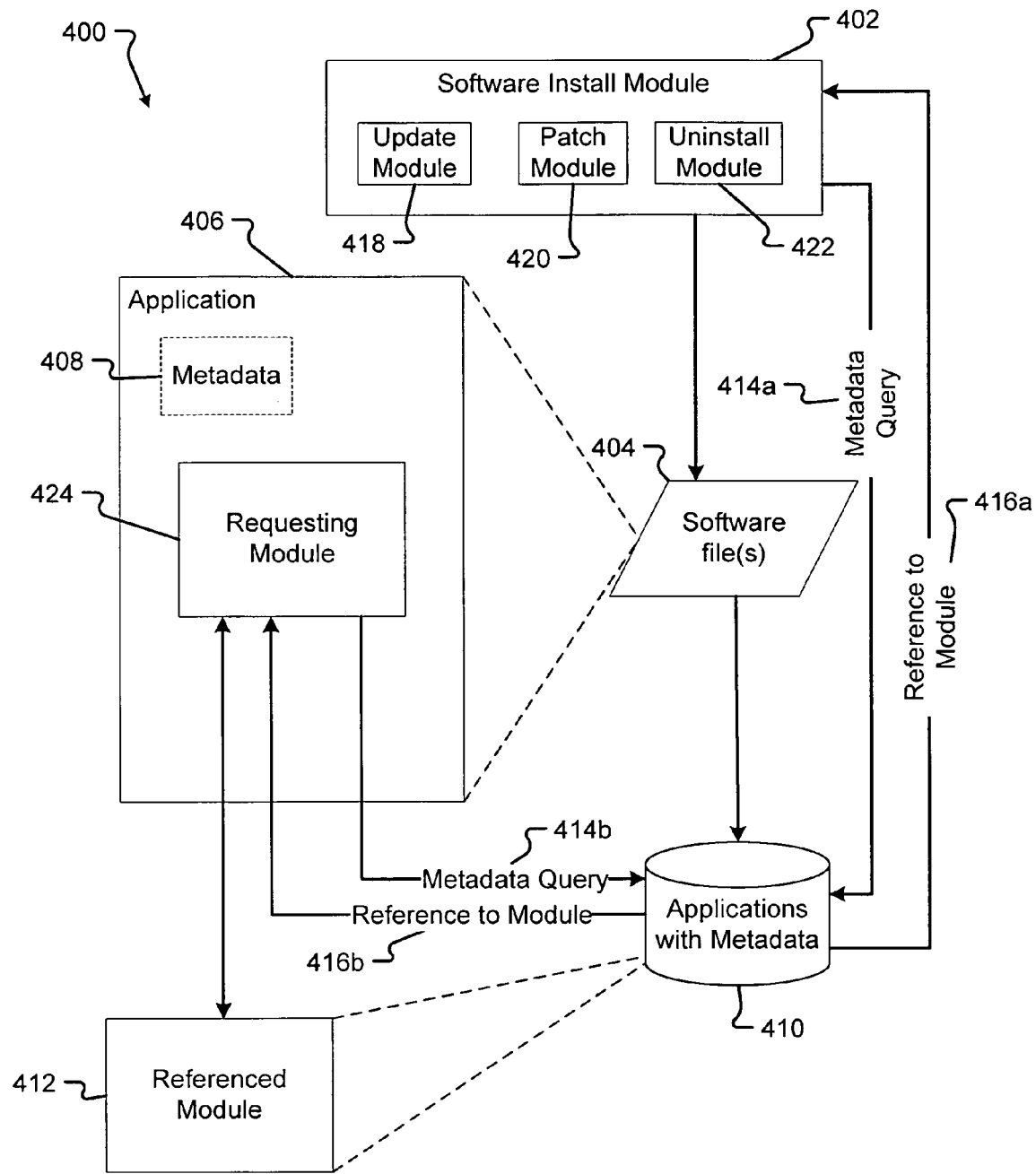
FIG. 4 is a functional diagram to an embodiment of the present invention illustrating the components of an application and a software system requesting another module on the computer according to the present invention.

A software system 400 employing the metadata model of the present invention is shown in FIG. 4. In one embodiment, the metadata model, such as metadata model 100, is used for the installation of software files 404. During installation, the application 406 and the metadata 408 integrated with the application 406 are written and stored into file system 410. In one embodiment, all files 404 related to the application 406 are stored in a single folder. The software modules used with the application are located in the single application folder but within one or more subfolders for the organization of the different modules used by the application 406. If a module has functionality to expose, e.g. the module file is shared with other applications, the metadata 408 integrated and stored with the application file or with the module file will specify how the modules are shared. In one embodiment, the module file is stored outside the application folder and the file's metadata exposes the file to interfaces with the application 406. The application 406 or another file need only query the metadata in the file system 410 to locate the file and call the module, as is explained below. Thus, the present invention eliminates the need to store files in certain locations to allow shared modules to be exposed to other applications of software objects.

In one embodiment, a software install module 402 installs the software files 404. To install an application 406, the user selects the software files 404 and selects an operation to store the software files 404 on the computer. In embodiments, the user drags and drops or copies and pastes the application onto the system. The copied software would already have an installed image with an application folder, the required software modules, and the metadata. The installed image of the application is transferred directly to storage of the computer without rewriting any metadata. The copy operation copies all files and the integrated metadata to the computer. Thus, the software install module 402 copies the software file(s) 404 and pastes the file(s) 404 with the integrated metadata into the file system 410. The metadata 408 provides indication to the operating system that the file 404 is an application folder 406. The operating system triggers a shell refresh, at the end of the copy operation, based on the application folder metadata 408. The refresh generates the shortcuts, shell extensions, and other interfaces specified in the metadata 408. As such, in one embodiment, all the interface items appear, in the user display, without using an installer interface.

In another embodiment, the user selects a user interface device that installs the application 406, such as an install button in a window. The install button initiates the install module 402. The install module creates an application folder. Then, the install module stores the application files and metadata into the application folder. In some embodiments, the software install module 402 provides some additional operations. In one embodiment, the software install module 402 writes the Install metadata. Thus, the software install module 402 generates the InstallId for all the files 404. The Install metadata is stored with the files 404 in file system 410.

In further embodiments, the software install module 402 allows the user to select features during the installation and/or customize the installation. Thus, the software install module 402 helps generate the settings metadata. Thus, the user need not use an installation interface for installations, but may change the installations with the software install module 402. In addition, the software install module 402 manages dependencies that are required for resiliency, as is explained below.

During an update, an update module 418, in the Install module 402, helps ensure the safe installation over the exiting applications. As explained above, the InstallId can have version dependent and version independent metadata. Updates generally require version dependent metadata. The software update module 418 sends a metadata query 414*a* to the file system 410. The metadata query 414*a* searches the metadata within the file system 410 for the version dependent InstallId that corresponds with the software files being updated. For example, the metadata query 414*a* searches for all "Microsoft.Office.12" InstallIds. Upon locating all files with the version dependent InstallId, file system 410 returns a reference 416*a* for all modules having metadata that matches the query 414*a*. The software update module 418 writes the new version of software over the old version of software files. The update module 418 overwrites the version dependent InstallId and maintains the file metadata and the settings metadata.

A patch module 420, in the install module 402, works similarly to the update module 418. However, the patch module 420 changes software across multiple versions. For example, if a security bug is found in the Microsoft® Office application suite, the patch module 420 changes the problematic software across any version of the Microsoft® Office application suite. To accomplish the patch, the software patch module 420 sends a metadata query 414a for the FileId, such as FileId 310. The FileId is the same identifier for all versions of a software module, as explained with reference to FIG. 3. The file system 410 returns a reference to modules 416a having the FileId. The patch module 420 overwrites all the software files needing replacement with the queried FileId. For example, if an Internet add-in in Microsoft® Word application has a security issue, the metadata query 414a specifies all versions of the internet add-in with the FileId of that software module. Upon receiving the reference 416a, the patch module 420 replaces the files included in the reference 416a. In one embodiment, a software developer using a remote computer, such as computer 280 (FIG. 2), connects with the patch module 420. The patch module 420 responds to commands to replace a certain software module with a certain FileId.

Another operation is an uninstall. Here, an uninstall module 422 sends a metadata query 414a to the file system 410 for software files with certain metadata. In one embodiment, the uninstall operation is targeted at a version of an application. A metadata query 414a comprises an InstallId, such as version dependent InstallId 320. All references 416a to software with the InstallId are returned. The uninstall module 422 removes the modules with the returned reference. In another embodiment, all instances of an application are uninstalled. A metadata query 414a for a FileId is sent to the file system 410. A reference 416a for all applications with the FileId is returned. The uninstall module 422 removes the applications provided in the reference 416a.

In calling another software module, the metadata stored with the software files replaces the need for the system registry. A requesting module 424 in an application 406 makes a metadata query 414b to the file system 410. In one embodiment, the query 414b is to the files within the application folder or subfolder of the application folder. In another embodiment, the query 414b is to all application folders throughout the computer system. Upon finding the metadata information in the metadata query 414b, the file system 410 returns a reference 416b, such as a pointer, to the appropriate software module 412. The requesting module 424 then uses the reference 416b to call the referenced module 412. In this embodiment, no call to a system registry is required.

Figure 5:
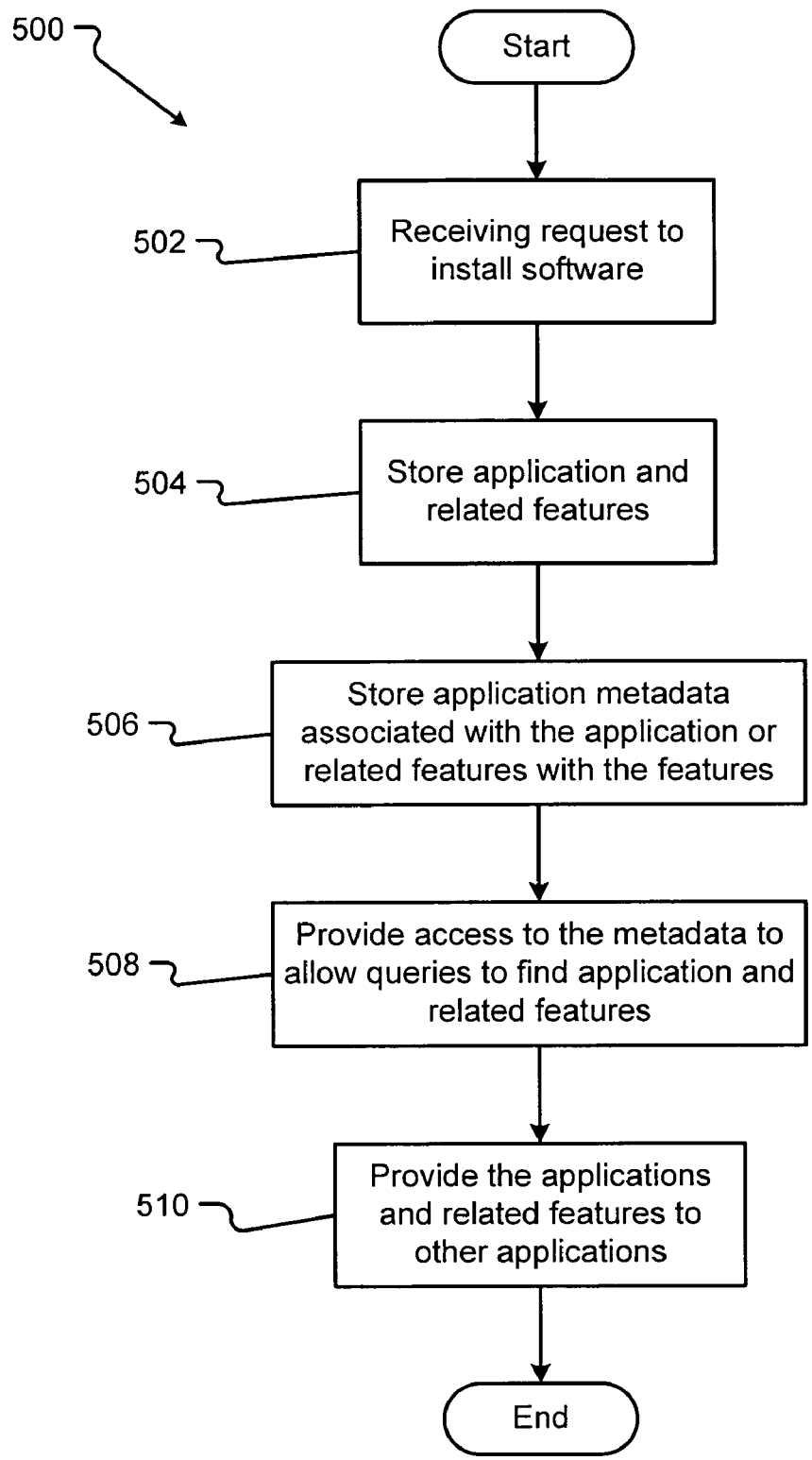
FIG. 5 is a flow diagram representing an embodiment of the present invention for installing an application with integrated metadata.

An exemplary embodiment of a method 500 for installing software is shown in FIG. 5. Receive operation 502 receives a request to install software. In one embodiment, the user completes a drag-and-drop operation with the user input device. In other embodiments, the user provides a media with the software and starts an installation. A user, in another embodiment, completes a copy and paste operation with the user input device. Regardless, the computer, such as computer 210, becomes aware that software is to be installed.

Store operation 504 creates an application folder, such as folder 104. Store operation 504 then stores the application software and any features that are integrated with the application in the application folder. For example, if the Microsoft® Excel spreadsheet application can have a feature for a calculator, the file for the feature is stored with the application in the application folder as a subfolder. In one embodiment, the application and all related files are stored in a single folder. Store operation 506 stores the application metadata with the application and stores the metadata for the features with the features. In embodiments of the present invention, the metadata comprises File metadata, such as File metadata 304, Install Metadata, such as Install metadata 306, and Settings metadata, such as settings metadata 306. In one embodiment, an install module, such as install module 402, writes the install metadata into the stored metadata. The install metadata specifies an InstallId, such as InstallId 312, and an Install Family, such as InstallFamily 314. In still further embodiment, the install module receives customized settings for the application from the user. The customized settings are stored in settings metadata.

Provide operation 508 provides access to the metadata to the application, other applications, or other software modules. In one embodiment, the metadata is serialized into a searchable file within the application folder. The metadata file is easily located by a machine-readable extension. Queries for the metadata, such as query 414b, are targeted at the metadata file, and responses return metadata from the file or references to the modules, such as reference 416b. In one embodiment, both the application and any associated features have a searchable file within the application folder. In another embodiment, there is one searchable file for the application and any features within the application folder. Provide operation 510 provides access to any shared software modules in the application or the features. In an embodiment, upon searching the metadata, a reference to a module within the application folder is returned. The reference allows a call to the module within the application folder.

In another embodiment, multiple versions of the same software coexist on the computer. In such a case, the installation process for the first version of the application stores the application and its related features in a self-contained folder. All metadata is also stored within the same folder. Later, a second version of the application is stored in a second separate folder. The second folder contains all metadata for the second version of the application. There is no required interaction between the application versions.

In another embodiment, a subfolder within the application folder holds the InstallSource metadata, such as InstallSource 318. The InstallSource is the compressed code from the installation. Any patches applied to the application or features are also stored in the InstallSource subfolder. In a further embodiment, an InstallPackage metadata, such as InstallPackage 316, describes the installed software. Upon a call failing to locate an updated software module, resiliency code is executed. The resiliency code reviews the InstallPackage for the module that was originally used before the updated module was erased. The resiliency code finds and restores the original module from the InstallSource. Therefore, any change in the application folder can "fallback" to the original installation if the changes are destructive.

Figure 6:
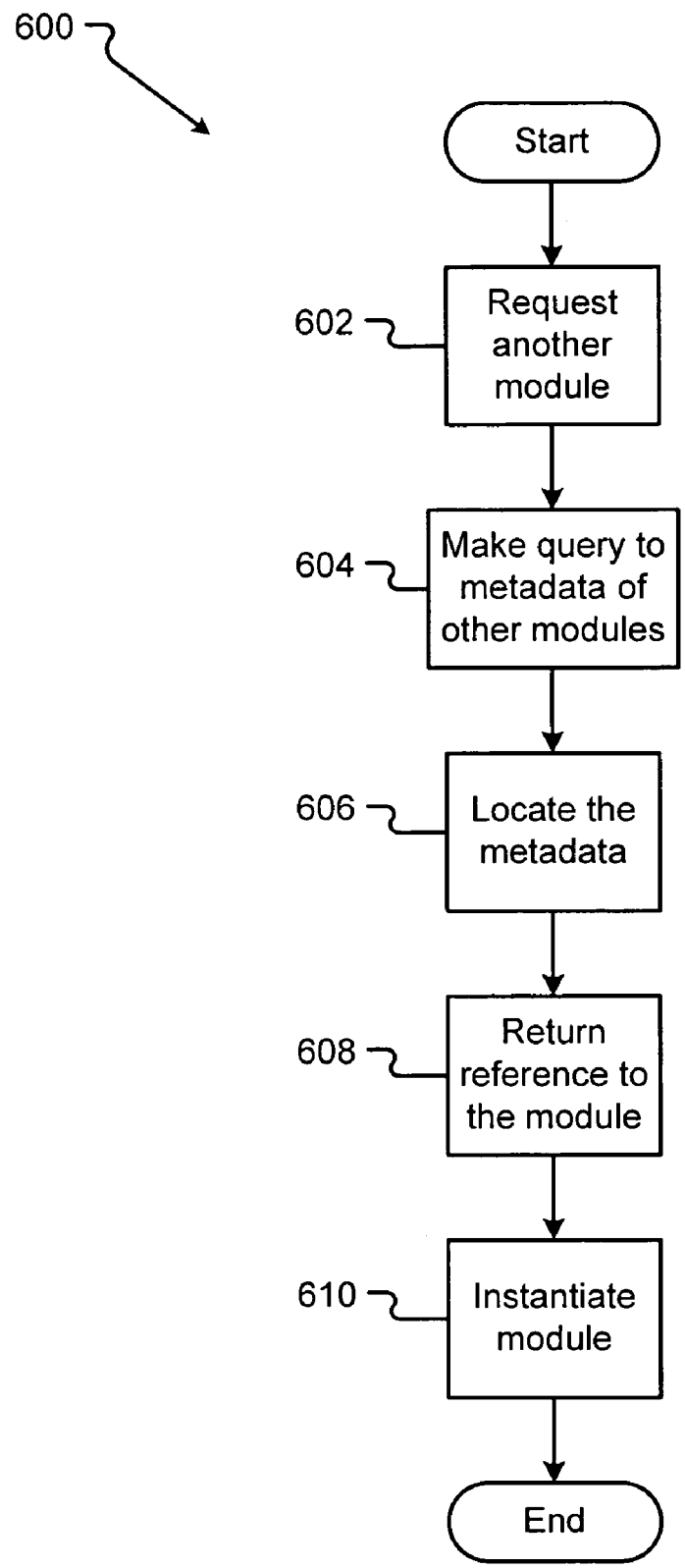
FIG. 6 is a flow diagram of a further embodiment of the present invention for calling another module by querying the metadata stored with the modules.

An exemplary embodiment of a method 600 for calling a software module using the metadata is shown in FIG. 6. Request operation 602 requests another module, such as module 412. In one embodiment, a software object calls another object on the computer system. The call initiates an operation to find the other module or object. Thus, query operation 604 makes a query, such as query 414b, to the metadata within the computer, such as computer 210, for the required module or object. In one embodiment, the query is confined to the application folder of the requesting module. In another embodiment, the query extends to another one or more application folders. A query, in another embodiment, queries all metadata within the entire computer.

Locate operation 606 locates the object or module with the metadata that matches the query. Return operation 608 returns a reference, such as reference 416b, to the module requested. In one embodiment, the reference is a pointer to the requested module. The pointer is used to send a call directly to the object or module. Instantiate operation 610 instantiates the module or object. In an embodiment, the call sent to the object instantiates the objects. In another embodiment, the call initiates a software application, module, several applications, or several modules.

An exemplary embodiment of a method 700 for changing the software on a computer using the metadata is shown in FIG. 7. Query operation 702 queries, such as query 414a, the computer, such as computer 210, for metadata, such as metadata 302. In an embodiment, the query is for an ID within the metadata. If the software change were an update, the metadata query is for an InstallId, such as InstallId 312. In a further embodiment, the query is for a version specific InstallId, such as InstallId 320. If the software changes were for a patch, the metadata query is for a FileId, such as FileId 310. If the software changes were for an uninstall operation, the query is for either a FileId or and InstallId.

Receive operation 704 receives one or more returns of references, such as reference 416a to software metadata having the queried metadata. Replace operation 706 changes the software modules. In one embodiment, in an update or patch operation, the old version of the software module is erased and a new version of the software module is written over the old version. A user, in one embodiment, uses a drag-and-drop operation. A drag-and-drop operation requires the image with all metadata settings from the new version of software to be stored with the software. Change operation 708 selectively changes portions of the metadata because some portions of the metadata are not affected, such as user settings, but other portions are affected by the change. For example, the FileId and the settings metadata may remain untouched, but the install metadata is updated. If the operation is an uninstall operation, all software is erased including all the metadata. In a patch operation, the Install and Settings metadata remain unchanged and the File metadata changes. In an install operation, all metadata is new. In an update operation, the settings and file metadata remain unchanged, and the install metadata is changed.

In a further embodiment, old metadata is resiliently reapplied after an uninstall operation. For example, an application had an original file for a software feature. The file was replaced with an update sometime later with new metadata to refer to the new file. Sometime later the new file is uninstalled. Then, change operation 708 retrieves the InstallPackage, such as InstallPackage 316, in the Install metadata. The InstallPackage includes all metadata for the original installation. The old file is determined, and the InstallSource, such as InstallSource 318, is accessed. The InstallSource, in the Install metadata, holds the code for the original installation. Resiliency code is fired that retrieves and restores the old file to the application folder with its metadata. Any new query to the metadata for the file reverts to the old metadata that now refers to the old file. In this way, the application continues to work with the old file without breaking after the uninstall operation.

Although the present invention has been described in language specific to structural features, methodological acts, and computer readable media containing such acts, it is to be understood that the present invention defined in the appended claims is not necessarily limited to the specific structure, acts, or media described. One skilled in the art will recognize other embodiments or improvements that are within the scope and spirit of the present invention. Therefore, the specific structure, acts, or media are disclosed as exemplary embodiments of implementing the claimed invention. The invention is defined by the appended claims.

What is claimed is:

1. A computer-readable storage medium encoding a computer program that executes a computer implemented method for installing a computer software application, comprising:

receiving a command to install a first computer software application;

in response to the command to install the first computer software application, creating a first application folder within a file system on a computer storage medium;

storing at least one software module within the first application folder, wherein the at least one software module is a portion of the first computer software application;

storing metadata integrated with the first computer software application in the first application folder, wherein the metadata comprises install metadata comprising install information of the first computer software application;

identifying one or more other software modules as a submodule that is a portion of computer executable instructions in the at least one software module;

creating a subfolder for the submodule within the first application folder;

storing the submodule in the subfolder;

storing metadata integrated with the submodule in the subfolder, wherein the metadata integrated with the submodule comprises install metadata comprising install information of the submodule;

receiving a command to install a second computer software application having at least one second software module similar to a software module stored with the first computer software application on the computer storage medium;

creating a second application folder separate from the first application folder within the file system on the computer storage medium;

storing a second software module associated with the second computer software application in the second application folder;

storing metadata integrated with the second computer software application in the second application folder without changing the metadata in the first application folder such that the similar second software module is called by the second computer software application and the first application does not call the second software module as a result of the installation of the second computer software application, wherein the metadata of the second computer software application comprises install metadata comprising install information of the second computer software application;

querying metadata within at least the first and second application folders and within at least one or more subfolders of the first and second application folders;

returning one or more references for one or more software modules having integrated metadata that matches the query;

calling at least one software module using a returned reference without connecting to an operating system registry;

changing a plurality of software modules with the returned reference without changing the operating system registry; and changing the metadata integrated with the plurality of software modules without changing the operating system registry.

2. The computer-readable storage medium of claim 1, wherein metadata further comprises one or more of:
   file metadata comprising a file identifier uniquely identifying a file containing a software module such that the software module distributed with multiple computer software applications has the same file identifier; and
   settings metadata comprising settings related to the runtime operation of the computer software application and any of the software modules.

3. The computer-readable storage medium of claim 1, wherein the install metadata further comprises one or more of:
   an install id uniquely identifying each instance of a software module being installed;
   an install family specifying the computer software application with which the software module was installed;
   an install package describing all features and software modules installed during an installation;
   an install source containing a condensed version of computer executable code stored during the installation; and
   a version dependent install id identifying an installed file with a specific version.

4. The computer-readable storage medium of claim 1, the method further comprising:
   querying for an install id within metadata, wherein the install id uniquely identifies each instance of a software module being installed; and
   returning a reference to the software module having the install id in metadata.

5. The computer-readable storage medium of claim 1, the method further comprising:
   querying for a file identifier within metadata for one or more software modules, wherein the file identifier uniquely identifies a file containing a software module such that the software module distributed with multiple computer software applications has a same file identifier;
   returning a reference to one or more software modules with the file identifier; and
   changing the one or more software modules by replacing an old version of the one or more software modules with a new version of the one or more software modules without changing the operating system registry.

6. The computer-readable storage medium of claim 5, wherein an install id within the metadata is changed as a result of replacing the old version of the one or more modules, wherein the install id uniquely identifying each instance of a software module being installed.

7. The computer-readable storage medium of claim 1, the method further comprising:
   querying for a version dependent install id within metadata for one or more software modules, wherein the version dependent install id identifies one or more instances of a software module with a same file identifier and a same version;
   returning a reference to one or more software modules with the version dependent install id; and
   changing the one or more software modules by replacing an old version of the one or more software modules with a new version of the one or more software modules without changing the operating system registry.

8. The computer-readable storage medium of claim 7, wherein the install id within the metadata is changed after replacing the old version of the one or more software modules.

9. The computer-readable storage medium of claim 1, the method further comprising:
   querying for a version independent install id within metadata for one or more software modules, wherein the version independent install id identifies one or more instances of a software module with a same file identifier;
   returning a reference to one or more software modules with the version independent install id; and
   uninstalling the one or more software modules by erasing the one or more software modules without changing the operating system registry.

10. The computer-readable storage medium of claim 9, wherein the one or more software modules are all located in an application folder and the application folder is erased without changing the operating system registry.

11. The computer-readable storage medium of claim 10, wherein all metadata integrated with the one or more software modules is also erased without changing the operating system registry.

* * * * *